United States Patent [19]

Vinz

[11] 3,911,547
[45] Oct. 14, 1975

[54] PROCESS FOR THE PRODUCTION OF POROUS TUBES HAVING SMALL PORES

[75] Inventor: Peter Vinz, Ispra, Italy

[73] Assignee: European Atomic Energy Community (Euratom), Luxemburg

[22] Filed: Oct. 25, 1973

[21] Appl. No.: 409,591

[30] Foreign Application Priority Data
Oct. 26, 1972  Luxemburg............................ 66369

[52] U.S. Cl. ... 29/157.3 R; 29/163.5 R; 29/163.5 F; 29/476.5; 29/493
[51] Int. Cl.²......................................... B23P 15/26
[58] Field of Search......... 29/477.3, 157.4, 163.5 R, 29/157.3 R, 163.5 F, 419, 493, 497.5, 476.5

[56] References Cited
UNITED STATES PATENTS

| | | | |
|---|---|---|---|
| 2,903,787 | 9/1959 | Brennan | 29/419 |
| 2,968,405 | 1/1961 | Veres | 29/477 |
| 3,049,796 | 8/1962 | Pall | 29/163.5 F |
| 3,375,569 | 4/1968 | Eichinger | 29/163.5 R |
| 3,736,641 | 6/1973 | Fosdick | 29/163.5 F |
| 3,803,688 | 4/1974 | Peck | 29/157.3 R |

*Primary Examiner*—Al Lawrence Smith
*Assistant Examiner*—K. J. Ramsey
*Attorney, Agent, or Firm*—Stevens, Davis, Miller & Mosher

[57] ABSTRACT

A process for producing porous tubes having very small pores in which strips of commercial metal cloth are wound spirally in an overlapping manner to form a hollow member. The hollow member is then sintered by means of a sintering support member brought into contact with its inner or outer surface.

Porous tubes prepared by the process are resilient, have reduced wall thickness and very fine pores. Heat pipes may be produced by the process.

4 Claims, 3 Drawing Figures

PROCESS FOR THE PRODUCTION OF POROUS TUBES HAVING SMALL PORES

This invention relates to a process for the production of porous tubes having small pores.

Tubular capillary structure is of fundamental importance to the heat pipe principle. In the wetted condition it makes available the pressure difference required to maintain the two-phase flow. This pressure difference is a function of the surface tension of the heat transfer liquid, the degree of wetting by the heat transfer liquid and of the pore diameter of the capillary structure.

If it is assumed as a first approximation that the heat transfer liquid or heat carrier used provides satisfactory wetting, the pore size governs the value of the pressure difference. The smaller the pore, the greater the capillary pressure difference produced.

Structures which, although they provide the necessary capillary pressure difference, no longer constitute the actual liquid duct because of their increased coefficient of friction, have proved satisfactory for capillary structures of optimum pore sizes, particularly in the case of medium-temperature heat pipes, the heat carriers of which are liquid metals having high thermal conductivity e.g. caesium, potassium and sodium. In these systems, the liquid heat carrier may be transported outside the capillary structure between the wall and the structure.

Two different constructions have proved satisfactory. If the capillary structure is unstable, the liquid transport is effected in longitudinal grooves which are arranged in the form of a circle and the boundary webs of which prevent the deformation of the capillary structure. In a practical embodiment, the longitudinally grooved metal sheets are covered with conventional netting and the metal sheets are bent to form pipes provided with longitudinal grooves. The ends of the netting cloth protrude from the interior of the tube and are welded to the wall in the longitudinal joint.

If, on the other hand, the capillary structure is itself stable, the heat transfer liquid may be transported in an annular gap with a reduced frictional pressure drop.

The said construction is suitable only in the case of relatively coarse netting. Finer commercial netting can take the welding heat stresses only with deformation which always results in an increase of the pore size in the welding seam zone. The construction is also very complicated, the grooves have to be milled, a bending operation is required to form the tube, and a weld seam has to be made over the entire length of the tube, and is a tolerable solution only if the capillary structures obtained are still stable in shape and have comparable pore sizes.

Capillary structures which are stable in shape can also be made from commercial netting. A number of layers of such cloth may be compacted by means of a rotary swaging machine and then sintered. A stable porous tube is obtained having a relatively considerable wall thickness. An advantage of this construction is that commercial tubes and metal netting can be used, and this reduces the production costs in the manufacture of heat pipes of this construction. However when the cloth is so swaged it is not homogeneously compacted. In this production process the cloth is partially destroyed on the inside. Both these factors cause increased tolerance of the pore sizes, although if the wall thickness is sufficient the pores are smaller than the nominal value of the cloth used.

It is also known to sinter tubes from metal powder. Although very small pore sizes can be obtained in this way, the evaporation surface required is reduced to an unacceptable degree. Sintered powder tubes are relatively non-resilient and cannot be produced in very thin wall thicknesses. Impurities in the sintering material and uneven distribution thereof over the tube wall result in increased pore tolerances.

According to the present invention there is provided a process for producing porous tubes which process comprises winding one or more strips of commercial metal cloth in an overlapping spiral form to form a hollow member having an inner surface and an outer surface, bringing the inner or outer surface of the hollow member into contact with a sintering support member sintering the cloth and removing it from the supporting member.

In one embodiment of the present invention the sintering support member is a mandrel and the strips of cloth are wound on the mandrel.

Another embodiment of the present invention is illustrated in the accompanying single sheet of drawings in which.

Figure 1:
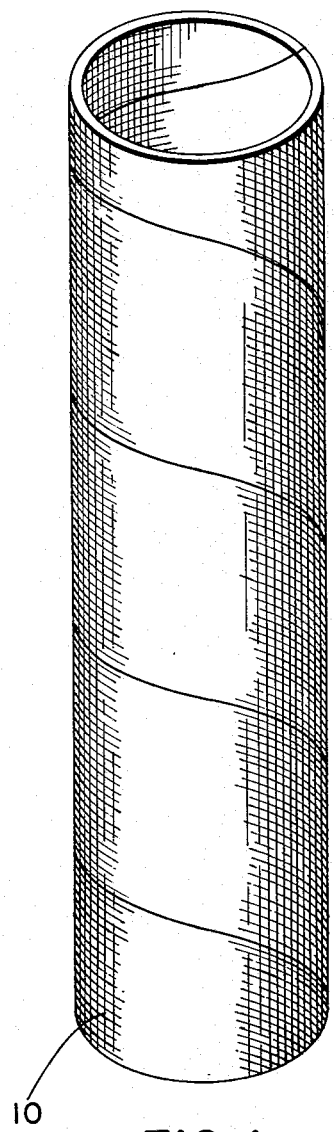
FIG. 1 is a perspective view of a hollow member made of coiled strips.
Figure 2:
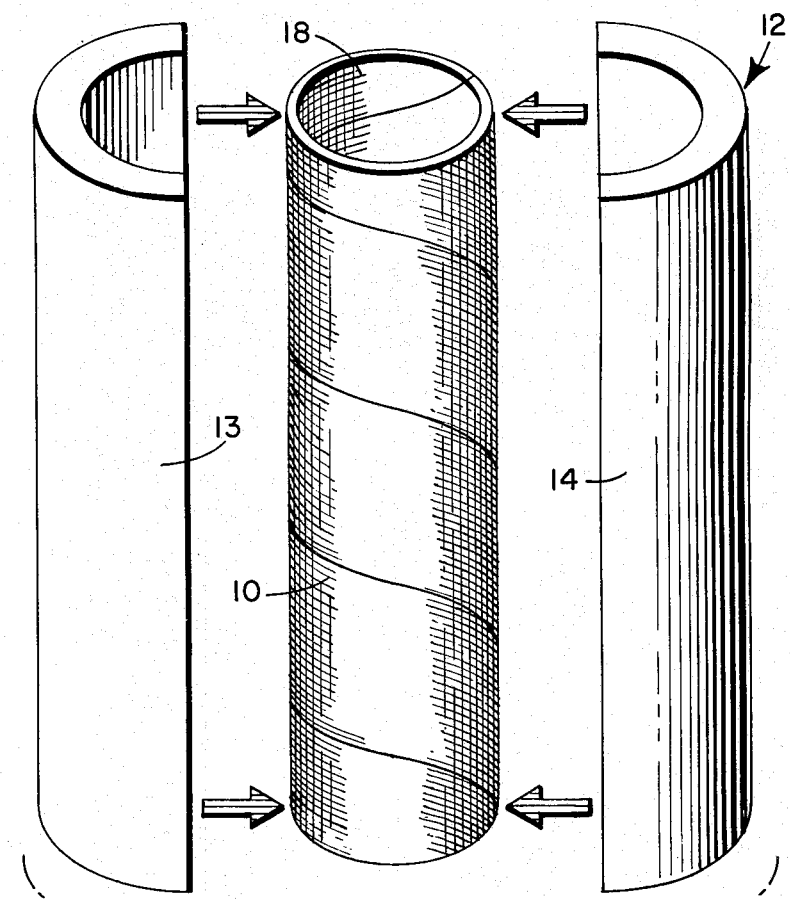
FIG. 2 is a perspective view of two half-shells positioned to enclose the hollow member.
Figure 3:
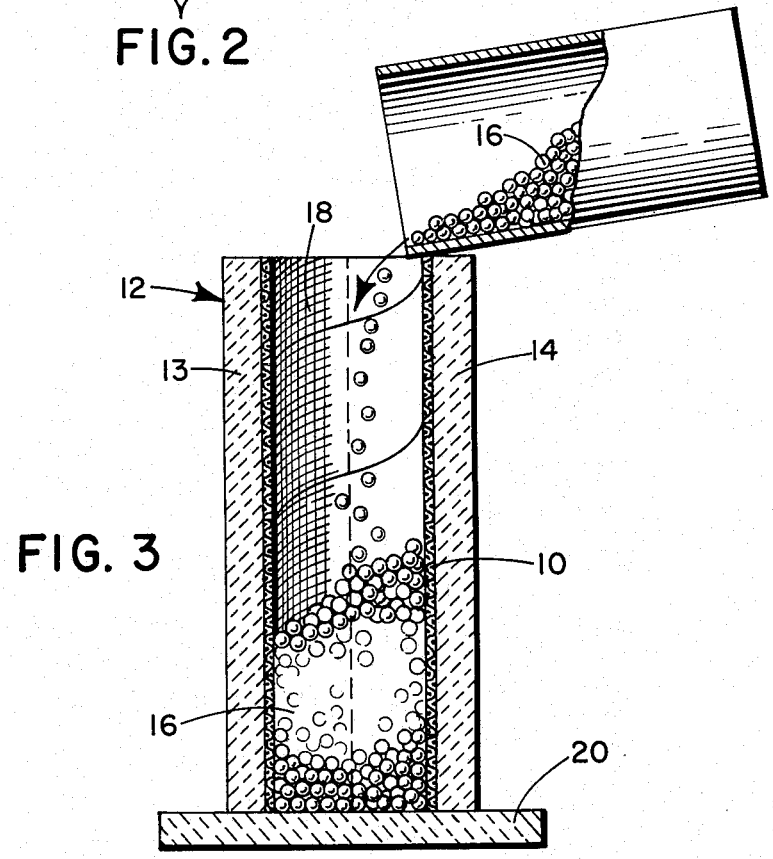
FIG. 3 is an elevational view, partially in section, showing ceramic beads being poured into the hollow member after the half-shells have been closed over the hollow member.

The sintering support member 12 is in the form of half-shells 13 and 14 which tightly enclose the coiled strips of the hollow member 10 during sintering, this member being formed as previously described. The member can be positioned in one half-shell while the other is closed over it. After closing, ceramic beads 16 are introduced into the cavity 18 of the hollow member 10 to produce the required contact pressure. The supporting elements and the base 20 advantageously consist of a ceramic material, e.g. $Al_2O_3$.

From the production aspect it is unimportant whether a plurality of layers of strips of netting are wound into a tube, or if just one strip is used. Furthermore, the quality in the case of a plurality of layers of netting is independent of the direction of winding.

Tubes prepared by this process may be resilient, and may have reduced wall thickness and very fine pore tolerances with pores which can be made as fine as required.

The reduction of the pore tolerance is due to the spirally overlapping strips. As a result of its production process, commercial metal cloth has faults in the form of varying intervals between wires, either along or at right angles to the longitudinal axis of the strips of netting. Irregularities have been found in which the pore size was three to four times the nominal value indicated by the manufacturers.

If a faulty strip of netting of this kind is wound in the form of a spiral on the mandrel, the fault is equalized in the case of a double overlap. A number of porous tubes produced according to the invention had without exception the pore size indicated by the manufacturer. It has also been found that there is a small consumption of expensive metal cloth, without impairing the quality of the porous tube. It is also important that strips of netting wound in an overlapping spiral are stable in shape in the unsintered condition even without a mandrel.

If they are sintered under tractive loading, a porous tube of reduced tube diameter is obtained. This possibility is particularly advantageous for porous tubes of high-melting metals (for example tungsten), the sintering temperature of which is above the melting temperature of the temperatureresistant ceramics.

A true-to-size outside diameter of the porous tube can be obtained with ceramic half-shells whose internal wall in the heated state forms the boundary for the tubular hollow member. To ensure that the tube bears uniformly against the half-shells, it is filled with ceramic beads of the order of 0.1 to 1.0 mm in diameter. This pressure may additionally be increased by means of a weight. It is also advantageous to vibrate the part continuously during sintering. The favorable vibration properties of beads enables a uniform contact pressure to be obtained over the entire tube surface.

This method was tried out with non-rolled strips of netting. The tubes prepared in this way were only optically inferior to the tubes sintered on mandrels, i.e., due to the surface roughness produced by the balls. The disadvantage of the half-shells as compared with the mandrels is that they are difficult to manufacture. In mass production, however, the half-shell method would be satisfactory, since the balls can be shaken out after sintering. A calibrated tube, on the other hand, must be re-heated in a high vacuum in order to remove the mandrel.

Commercial netting strips can be rolled to produce pores of any fineness. In this way it has been possible to process strips of netting in an extreme case to make completely dense sheets. During rolling it has been found advantageous to wet the metal cloth with a liquid (for example acetone, alcohol or water) during the forming operation. Netting rolled under a liquid gave a pore tolerance of 25 to 30 percent on average in the bubble test. The largest pore was one fifth of the initial size. Dry-rolled netting strips by comparison gave an average pore tolerance of 50–60 percent; this corresponds approximately to the pore tolerance of unrolled netting strips. It has been found that rolling under a liquid thus not only results in a general reduction of the size of the pores but also reduces mainly the largest pores. Furthermore it has been found that rolling also fixes the wires in relation to one another; the netting strip thus has a certain inherent stability and the largest pore is thus fixed as to location and not governed by statistics to some extent as in the unrolled netting. The first bubble always occurred at the same place in the rolled netting strip and at the same system pressure. These rolling tests were repeated a number of times and the results are reproducible under the same initial conditions. Rolled netting strips were used to produce porous tubes having ultra-fine pores (1–5 $\mu$m).

Sintering should advantageously be effected in a shielding gas atmosphere, noble gases or hydrogen of high purity being used as shielding gas. Constant porosity was obtained with a constant sintering temperature. For high quality sintering it is important that the prefabricated tubes should be cleaned by annealing in a high vacuum. The shielding gas is then admitted in the heated condition for sintering purposes.

I claim:

1. A process for producing porous tubes, said process comprising:
    winding at least one strip of commercial metal cloth in an overlaping spiral form to form a hollow member having an inner surface and an outer surface,
    bringing the outer surface into contact with a sintering support member having half-shells which enclose said wound strips,
    introducing ceramic beads into the cavity of the hollow member to create contact pressure between the hollow member and the half-shells,
    sintering the wound cloth and removing the sintered cloth from the support member.

2. A process according to claim 1 wherein said strips of cloth have been rolled under a liquid.

3. A process according to claim 1 wherein said sintering support member comprises a ceramic material.

4. A process according to claim 3 wherein said ceramic material is aluminium oxide ($Al_2O_3$).

* * * * *